(12) United States Patent
Iida et al.

(10) Patent No.: US 6,362,921 B1
(45) Date of Patent: Mar. 26, 2002

(54) OPTICAL ELEMENT, HOLDING STRUCTURE FOR OPTICAL ELEMENT, AND IMAGE PICKUP APPARATUS

(75) Inventors: Seiji Iida, Yokohama; Tsukasa Uehara, Kawasaki; Kenji Kawano, Tokyo, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/414,139

(22) Filed: Oct. 7, 1999

(51) Int. Cl.[7] .......................... G02B 27/10; G02B 27/14
(52) U.S. Cl. ...................... 359/627; 359/628; 359/630; 359/631
(58) Field of Search .................. 359/627, 628, 359/630, 631, 632, 633, 13, 739, 819

(56) References Cited

U.S. PATENT DOCUMENTS 5,760,931 A * 6/1998 Saburi et al. ................ 359/13
6,097,550 A * 8/2000 Kimura ...................... 359/729

* cited by examiner

Primary Examiner—Georgia Epps
Assistant Examiner—Michael A. Lucas
(74) Attorney, Agent, or Firm—Robin, Blecker & Daley

(57) ABSTRACT

In an optical element composed of an entrance refractive surface, an exit refractive surface and a plurality of internal reflective surfaces provided between the entrance refractive surface and the exit refractive surface, a structure is provided for enabling the optical element to turn around a reference axis of the entrance refractive surface. Further, in such an optical element, an diaphragm member is disposed adjacent to the entrance refractive surface and is arranged to vary an aperture diameter thereof according to a movement thereof.

28 Claims, 9 Drawing Sheets

OPTICAL ELEMENT, HOLDING STRUCTURE FOR OPTICAL ELEMENT, AND IMAGE PICKUP APPARATUS

BACKGROUND OF THE INVENTION

1. Field of the Invention

The present invention relates to an optical element having an entrance refractive surface, an exit refractive surface and internal reflective surfaces, a holding structure for the optical element, and an image pickup apparatus.

2. Description of Related Art

Image pickup in electronic still cameras or video cameras is performed by converting an object image formed on an image pickup element (hereinafter represented as a CCD, by way of an example) by an optical system into electrical signals by means of the CCD.

A range within which a sufficiently sharp image for actual usage is available before and behind the best imaging point by the optical system is called the depth of focus. To perform image pickup without defocusing or partial-defocusing, it is necessary to position a plane of the CCD within the depth of focus. The optical system and image pickup system having the autofocus mechanism conduct adjustment of the position of a lens group by detecting the focus in order to position the CCD plane always within the depth of focus. On the other hand, the optical system and image pickup system having no autofocus mechanism require the back-focus adjustment for adjusting the distance of the CCD plane with respect to the optical system.

The back-focus adjustment is performed, for example, in the adjustment step during the assembly process by using jigs and tools, or after the assembly process by integrating an adjustment mechanism within the holding member for the CCD.

The former of the above-described back-focus adjustment has such disadvantages that replacement or recycling of the CCD is not possible because the CCD is completely fixed by adhesives after adjustment, and the adjustment step takes much time.

Now, an example of the latter of the above-described back-focus adjustment is shown in FIGS. 9A and 9B. FIG. 9A is a sectional view showing a cross-section of a typical single-focus lens unit and image pickup system along a plane including the optical axis. In FIG. 9A, the CCD is not represented by a cross-section.

FIG. 9B is a plan view of the back-focus adjustment mechanism for the CCD, as viewed in the direction of arrows on a plane represented by the two-dotted chain line in FIG. 9A. In FIGS. 9A and 9B, reference numeral 101 denotes a lens group composed of a plurality of lens elements, reference numeral 102 denotes a lens barrel for holding the lens group 101 and blocking light, reference numeral 103 denotes optical correction plates having a quartz low-pass filter and an infrared-cutting filter, reference numeral 104 denotes a CCD, reference numeral 104a denotes an image pickup plane of the CCD 104, reference numeral 104b denotes a corner portion of the image pickup plane 104a, reference numeral 105 denotes a CCD holding plate made of metal for holding the CCD 104, reference numeral 106 denotes a CCD circuit board for transmitting image signals to a flexible cable 108, etc., by electrically connecting terminals of the CCD 104 with soldering, etc., reference numeral 107 denotes an insulating member for insulating the CCD holding plate 105 from the CCD circuit board 106, reference numeral 109 denotes a base plate for holding the CCD holding plate 105 so as to allow adjustment of back-focus and tilt with respect to the lens barrel 102, reference numeral 109a denotes positioning holes for regulating the position of the base plate 109 with respect to the lens barrel 102, and reference numeral 109b denotes tapped holes for fastening the base plate 109 to the lens barrel 102 by screws. Reference numeral 110 denotes a back-focus feed screw for back-focus adjustment, reference numerals 111 and 112 denote a spring and an urging screw, respectively, for urging the CCD holding plate 105 toward the base plate 109, and reference numeral 113 denotes tilt adjusting screws for adjusting tilts around the x axis and y axis of the CCD holding plate 105.

The back-focus feed screw 110 engages with a tapped hole of the base plate 109 with the tip of the back-focus feed screw 110 in contact with the CCD holding plate 105. In an example shown in FIG. 9A, the tip of the back-focus feed screw 110 is arranged so as to come into contact with the rear side of the CCD holding plate 105 at a point corresponding to the corner portion 104b of the image pickup plane 104a of the CCD 104. The CCD 104 is fixed to the CCD holding plate 105 by bonding, etc., after positioning by a jig. The CCD holding plate 105 is moved by the back-focus feed screw 110 in directions for changing the distance from the optical system. More specifically, turning clockwise the back-focus feed screw 110 causes the CCD holding plate 105 to move toward the lens group 101, thereby decreasing the back-focus. Conversely, turning counterclockwise the back-focus feed screw 110 causes the CCD holding plate 105 to move away from the lens group 101, thereby increasing the back-focus.

Furthermore, the tilt of the CCD holding plate 105 is adjusted by the urging screw 112 and the two tilt adjusting screws 113. The urging screw 112 engages with a tapped hole of the CCD holding plate 105, and can freely move with respect to the base plate 109 along the axial direction thereof with positional restriction only in the direction of the plane of the base plate 109. The spring 111 is held in a compressed state between the urging screw 112 and the base plate 109 with the head of the urging screw 112 utilized, so as to apply an urging force to move the urging screw 112 in the direction away from the lens group 101 by a force of repulsion of the spring 111. This urging force causes a rotational moment working on the CCD holding plate 105 with the tip of the back-focus feed screw 110 acting as a fulcrum, but the tilt of the CCD holding plate 105 is restricted by two tilt adjusting screws 113. More specifically, the tilt adjusting screws 113 engage with tapped holes of the CCD holding plate 105 but can freely move with respect to the base plate 109, so that the tilt adjusting screws 113 are pulled in by the moment working on the CCD holding plate 105 to regulate the position of the CCD holding plate 105 at the location where the heads of the tilt adjusting screws 113 come into contact with the base plate 109. At this time, if an axis parallel to the longer side of the CCD image pickup plane 104a is set as the x-axis and an axis parallel to the shorter side as the y-axis out of axes passing through the corner portion 104b of the CCD image pickup plene 104a, the tilt adjusting screws 113 are disposed on the x-axis and the y-axis, respectively, to rotate the CCD holding plate 105 around the x-axis or the y-axis by turning either one of the tilt adjusting screws 113. Arranging the back-focus feed screw 110 and the tilt adjusting screws 113 in the above-described way allows performing adjustment readily in the directions around the x-axis or the y-axis independently.

Conducting the above operation while monitoring image signals from the CCD 104 generated by picking up an image of an evaluation chart allows performing adjustment of back-focus and tilt of the CCD 104. However, in the above-described back-focus adjustment method, the fulcrum of the CCD holding plate 105 shifts its position when the back-focus adjustment is performed. Therefore, the tilt adjustment is required always after the back-focus adjustment, so that it is impossible to perform the back-focus adjustment independently of the tilt adjustment.

Also, as shown in FIG. 9A, the lens group 101 is positioned in the direction perpendicular to the optical axis by the inner periphery of the lens barrel using the outer peripheries of the lens group 101 and in the direction along the optical axis by bringing the refractive surfaces of the lens group 101 into contact with the steps formed inside the lens barrel, and is then fastened by bonding or by a set ring or the like to the lens barrel. It is important for such an optical system to precisely align the positions of a plurality of lens elements and the positions of the lens group and the CCD. This is realized by enhancing the precision of the individual lens element and that of the lens barrel.

Typically, the conventional optical unit is constructed by holding a plurality of single lens in a lens barrel, and the optical unit is fixed to a camera body. The lens barrel is composed of a plurality of parts with complex shape, which require high precision assembly. Also, surface treatment such as painting or anodized aluminum is required for the parts of the lens barrel, resulting in expensive parts. Moreover, the size of the whole optical unit becomes considerably larger than the single lens.

Recently, further reduction in size of apparatuses is demanded due to increasing popularity of video cameras or electronic still cameras. Also, a demand for mobile communication terminals having the image information handling capability is rising as the information infrastructure has been developing. Further, research and development are being performed to reduce the size of an optical system, too, which is a constituent component of the apparatus for realizing the above demands. For example, as disclosed in U.S. Pat. No. 5,825,560 or U.S. patent application Ser. No. 08/606,825 filed Feb. 26, 1996, an optical element is proposed which is composed of two refractive surfaces and a plurality of reflective surfaces integrally formed on the surfaces of a transparent body so as to allow a light flux to enter from one of the refractive surfaces into the inside of the transparent body and, then, exit out of the other refractive surface after repeating reflections on the plurality of reflective surfaces.

This optical element enables the size thereof to be reduced compared to the conventional lens because it is possible to keep the light-passing effective aperture of each of the surfaces small by adopting a construction of transmitting an object image while repeating many times of imaging. Also, since any conventional lens barrel is not required, it is possible to further reduce the size, the number of parts and costs of the optical element.

The optical element must be positioned highly precisely in the image pickup apparatus. This is realized in the conventional lens by enhancing the precision of individual lens element and the lens barrel, as mentioned in the foregoing. However, a method for positioning of an optical element different from the conventional one is required for the present optical element, since one of its advantages lies in the capability of realizing the reduction of size of the apparatus by eliminating any lens barrel.

However, when such an optical element as having a plurality of integrally-formed reflective surfaces is used in constructing an image pickup apparatus, a problem arises in that the usage of the above-described conventional back-focus adjustment mechanism will hinder the reduction of size and cost of the apparatus. Since this problem reduces the value of the advantage of characteristics of the present optical element or capability of reducing size and cost, it is necessary to develop a back-focus adjustment method suitable for such an optical element.

Also, when such an optical element as having a plurality of integrally-formed reflective surfaces is used in constructing an image pickup apparatus, another problem arises in that the usage of the conventional construction of holding the optical element by a holding member as in the case of the conventional lens barrel for mounting the holding member to a camera body will increase the size of the apparatus and the number of parts and costs. Also, a further problem arises in that the usage of the construction of the conventional optical system covering the whole optical system with the lens barrel for the purposes of light-blocking and dust-proofing similarly results in an increase of size and cost of the apparatus.

In constructing an image pickup apparatus using an optical element, optical diaphragm means is required for regulating the amount of light entering the optical element. As for the optical diaphragm means, generally is used the so-called turret system in which a diaphragm blade having holes of various diameters is rotated manually or by a driving means, or the so-called IG-meter system in which an aperture is formed by a gap made by two or more diaphragm blades and the size of the aperture is varied by moving the diaphragm blades by means of a driving means. When such a diaphragm means is used in the present optical element, if the diaphragm blades are held by a holding member and the holding member including the diaphragm blades is disposed on the entrance surface of the optical element, a problem arises in that the advantage of the present optical system of realizing thinner profile is disrupted due to an increase in thickness of the image pickup apparatus by the thickness of the holding member.

As mentioned above, suitable methods of holding such an optical element and of disposing an optical diaphragm means are required.

BRIEF SUMMARY OF THE INVENTION

In accordance with an aspect of the invention, there is provided an optical element, comprising an entrance refractive surface, an exit refractive surface and a plurality of internal reflective surfaces provided between the entrance refractive surface and the exit refractive surface, wherein a structure is provided for enabling the optical element to turn around a reference axis of the entrance refractive surface.

In accordance with another aspect of the invention, there is provided an image pickup apparatus, comprising an optical element having an entrance refractive surface, an exit refractive surface and a plurality of internal reflective surfaces provided between the entrance refractive surface and the exit refractive surface, and an diaphragm member which is disposed adjacent to the entrance refractive surface and is arranged to vary an aperture diameter thereof according to a movement thereof.

The above and further aspects and features of the invention will become apparent from the following detailed description of a preferred embodiment thereof taken in conjunction with the accompanying drawings.

DETAILED DESCRIPTION OF THE INVENTION

Hereinafter, a preferred embodiment of the invention will be described in detail with reference to the drawings.

Figure 1:
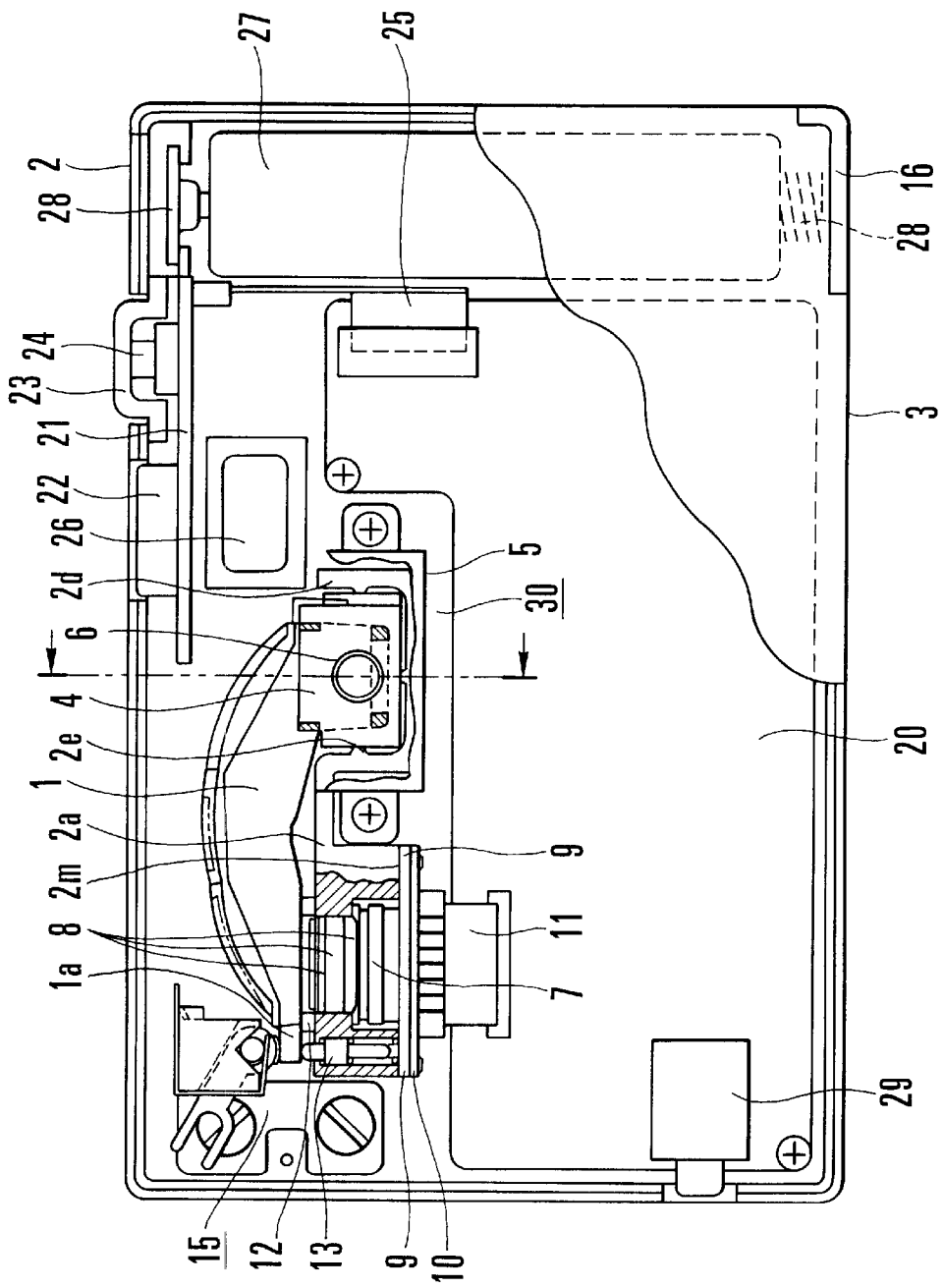
FIG. 1 is a plan view illustrating the general construction of an image pickup apparatus according to an embodiment of the invention.

FIG. 1 is a plan view of an electronic still camera serving as an image pickup apparatus according to the embodiment of the invention. In FIG. 1, the electronic still camera is illustrated with a lower case 3, to be described later, of the camera cut away for the convenience of description.

In FIG. 1, reference numeral 1 denotes an optical element composed of two refractive surfaces and a plurality of reflective surfaces integrally formed on surfaces of a transparent body so as to allow a light flux to enter from one of the refractive surfaces into the inside of the transparent body and, then, exit out of the other refractive surface after repeating reflections on the plurality of reflective surfaces, reference numeral 1a denotes a brim portion formed as a tongue-like shaped protrusion provided adjacent to the exit surface, reference numeral 2 denotes an upper case serving as an outer covering member or a base, and reference numeral 3 denotes a lower case for forming the camera body by being combined with the upper case 2. Both the upper case 2 and the lower case 3 are made of plastic or the like by molding process. Reference numeral 2a denotes a CCD holding wall for holding an optical correction plate and a CCD, as well as for blocking light, reference numeral 2d denotes a U-shaped optical-element holding wall disposed perpendicularly to the paper surface of FIG. 1, and reference numeral 2e denotes ribs of approximately-semicircular cross-section disposed on three points of the inside of the holding wall 2d. The CCD holding wall 2a, the optical-element holding wall 2d and the ribs 2e are formed integrally with the upper case 2. In FIG. 1, a part of the holding wall 2a is illustrated as being cut away for the convenience of description. Reference numeral 2m denotes an end surface of the CCD holding wall 2a, perpendicular to the paper surface of FIG. 1, to which a base plate 9 to be described later is fixed.

Reference numerals 4, 5 and 6 are a spacer, a holder and a holding spring for holding the optical element 1, respectively, which will be described later in detail. Also, in FIG. 1, a part of the holder 5 is illustrated as being cut away for the convenience of description. The whole of those parts for holding the optical element 1 is generally referred to as a holding portion 30.

Reference numeral 7 denotes a CCD serving as an image pickup element, reference numeral 8 denotes an optical correction plate, reference numeral 9 denotes a base plate for fixing the CCD 7 thereto by bonding or the like, reference numeral 10 denotes a CCD circuit board for securing the terminals of the CCD 7 thereto by solder or the like, and reference numeral 11 denotes a flexible cable for electrically connecting the CCD circuit board 10 to a main circuit board 20 to be described later.

Reference numeral 12 denotes a light-blocking rubber of the ring-like shape made of an elastic body such as rubber for blocking light between a concave refractive surface S8, to be described later, of the optical element 1 and the CCD holding wall 2a, and reference numeral 13 denotes a press-for-adjustment piece serving as an arresting means or a pressing member. The press-for-adjustment piece 13 is urged upward from the bottom side in FIG. 1 by a spring 14 (see FIG. 8A) so as to press the brim portion 1a of the optical element 1 upward from the bottom side in FIG. 1. The tip of the press-for-adjustment piece 13 which comes into contact with the brim portion 1a has a spherical shape.

Also, the spring 14 is compressed with its one end restricted by the press-for-adjustment piece 13 and the other end restricted by the base plate 9. Reference numeral 15 denotes a back-focus adjusting portion, to be described later, for holding an adjusting cam 52 (see FIG. 7) serving as an arresting means or another pressing member. The press-for-adjustment piece 13 holds the brim portion 1a of the optical element 1 by pinching the brim portion 1a in conjunction with the adjusting cam 52.

The back-focus adjusting portion 15 is held on the upper case 2 in such a way as to be movable in the direction of pressure of the press-for-adjustment piece 13. According to the movement of the back-focus adjusting portion 15, the pinching position with respect to the brim portion 1a is moved, so that the optical element 1 is turned so as to perform the back-focus adjustment. Reference numeral 16 denotes a battery chamber lid for inserting or taking-out of a battery 27.

Reference numeral 20 denotes a main circuit board for controlling an operation of the whole camera, reference numeral 21 denotes an operational panel board on which a display part 22 for displaying various photo-taking information and a switch 24 for detecting pressing-down of a release button 23 for giving an instruction for photo-taking are mounted, reference numeral 25 denotes a flexible cable for electrically connecting the operational panel board 21 to the main circuit board 20, reference numeral 26 denotes an optical viewfinder, reference numeral 27 denotes a battery serving as a power source, reference numeral 28 denotes power source terminals, and reference numeral 29 denotes an output terminal for outputting image signals to external equipment such as a monitor, etc.

Incidentally, such an image display device as a liquid crystal monitor may be used in place of the optical viewfinder 26.

Figure 2:
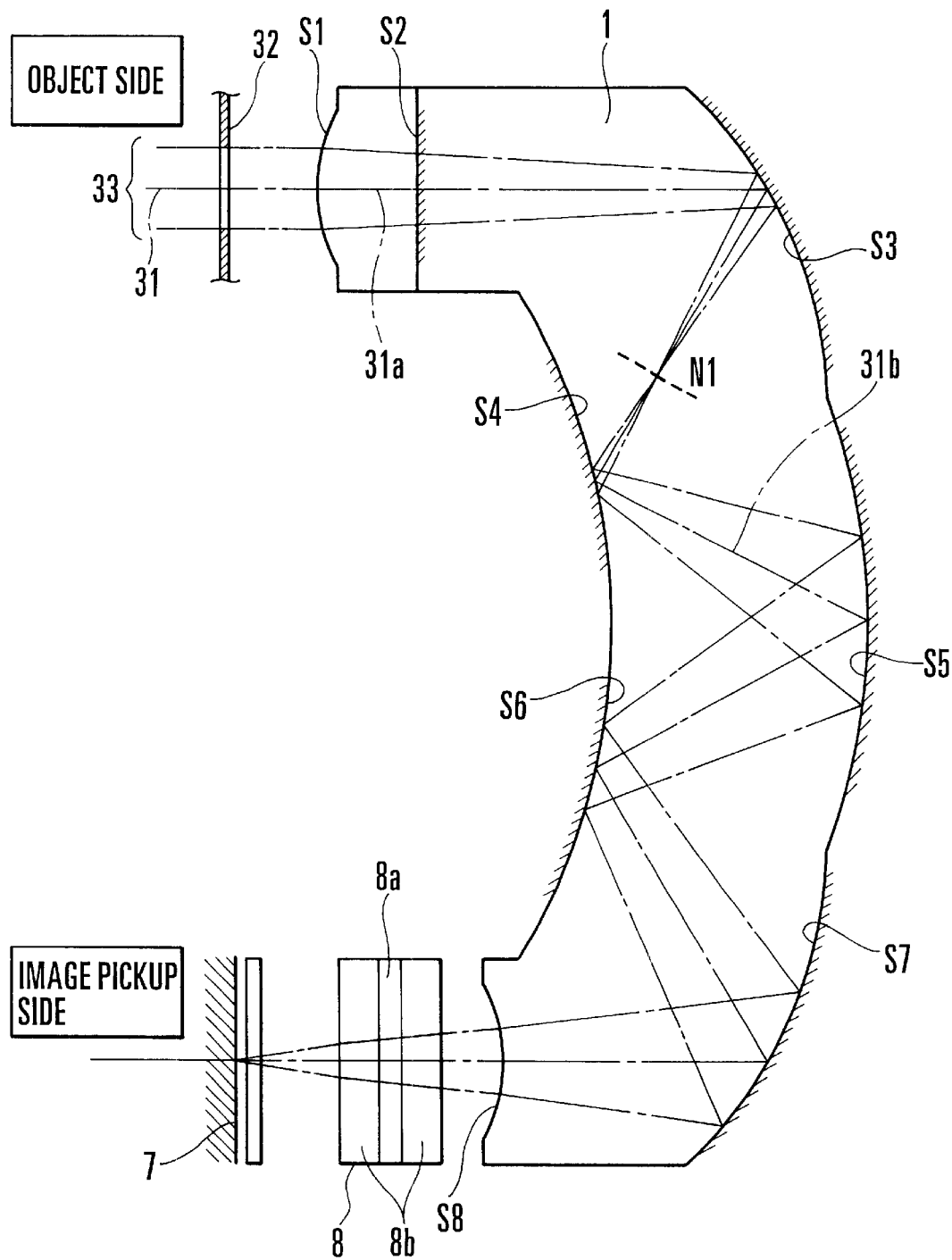
FIG. 2 is a sectional view schematically illustrating an optical path of an optical element according the embodiment of the invention.

FIG. 2 is a cross-sectional view of an optical path in an optical system using the optical element 1 according to the embodiment of the invention.

The optical element 1 in the embodiment has a fixed focus with actual parameter settings of focal length f=28 mm (35 mm silver-halide photograph conversion) and F-number of F2.0, but is not limited only to such settings in the following description.

The optical system in the embodiment of the invention is a decentering optical system, in which surfaces constituting the optical system have no common optical axis. Therefore, in order to describe the constitution of various components in the optical system, a "reference axis" is set in the optical system.

First, the definition of the reference axis will be described. In general, the optical path of a ray of light of reference wavelength serving as a reference advancing from the object plane to the image plane is defined as a "reference axis" in the optical system. Since the ray of light serving as a reference can not be determined by the above definition only, a "reference axis ray" is normally set according to either one of the following two principles.

(1) In a case where there exists an axis having symmetry at least partially in the optical system and correction of aberrations can be performed with good symmetry, a ray of light passing on the axis having symmetry is set as the reference axis ray.

(2) In a case where there exists no symmetric axis in general in the optical system or, even if there exists a symmetric axis in part, correction of aberrations can not be performed with good symmetry, a ray of light which comes from the center of the object plane (the center of a photographed range or an observed range), passes through the optical system in the order of designated surfaces of the optical system and passes through the center of a diaphragm in the optical system, or a ray of light which passes through the center of a diaphragm in the optical system and reaches the center of the final image plane, is set as the reference axis ray, and an optical path of the reference axis ray is defined as the reference axis.

The reference axis which is defined in the above-described manner has generally a bent shape. Here, in each surface of the optical system, an intersection point between the surface and the reference axis ray is assumed to be a reference point of the surface, the reference axis ray on the object side of the surface is assumed to be an entrance reference axis, and the reference axis ray on the image side of the surface is assumed to be an exit reference axis. Further, the reference axis is assumed to have a direction (orientation), and the direction of the reference axis is a direction in which the reference axis ray advances in forming an image. Accordingly, there exist an entrance reference axis direction and an exit reference axis direction on the entrance side and the exit side, respectively. Thus, the reference axis finally reaches the center of an image plane while changing its direction in the order of the designated surfaces in accordance with the law of refraction of reflection. Also, in the case of an optical element which is composed of a plurality of surfaces, the reference axis ray which enters a surface closest to the object side of the optical element is assumed to be the entrance reference axis, and the reference axis ray which exits from a surface closest to the image side of the optical element is assumed to be the exit reference axis. In this case, the definition of the direction of the entrance or exit reference axis is made in the same manner as described above in the case of the surface.

In the optical element 1 according to the embodiment of the invention, a path of a ray of light (reference axis ray) which passes through the center of the light-passing effective aperture of a diaphragm and reaches the center of the final image plane is defined as a reference axis 31, along which the ray of light is refracted or reflected by each of refractive surfaces or reflective surfaces to be described later. In FIG. 2, for simplification of the description, a plane containing the reference axis is represented as being parallel to the paper surface of FIG. 2. However, in actuality, a surface S2 of the optical element 1 is a reflective surface disposed at an angle of 45° with the paper surface of FIG. 2, and the reference axis is bent upward perpendicularly to the paper surface of FIG. 2 at the surface S2. A part of the reference axis from the surface S1 to the surface S2 is denoted by reference numeral 31a, and a part of the reference axis from the surface S3 to the surface S8 is denoted by reference numeral 31b.

In FIG. 2, reference numeral 32 denotes an optical diaphragm disposed adjacent to the optical element 1 on the object side (light-flux entrance side), and reference numeral 8 denotes an optical correction plate composed of low-pass filers 8b disposed on both sides for generating birefringence in horizontal and vertical directions, respectively, and a infrared-cutting filter 8a disposed in the middle part. Reference numeral 33 denotes light coming from the object.

The optical element is composed of a convex refractive surface S1, a plane mirror S2, a concave mirror S3, a convex mirror S4, a concave mirror S5, a convex mirror S6, a concave mirror S7, and a concave refractive surface S8, in that order from the object side. In the case of the embodiment, the surfaces S1 and S8 are spherical surfaces, while the surfaces S3 to S7 have free curved surfaces to obtain appropriate optical performance.

The light from the object enters the convex refractive surface S1 of the optical element 1 after the amount of entering light is restricted by the optical diaphragm 32. The object light which has entered the convex refractive surface S1 is next reflected by the plane mirror S2 to be bent at a right angle, reaching the concave mirror S3. The object light reflected by the concave mirror S3 forms a primary image of the object on an intermediary image plane N1 by the power of the convex refractive surface S1. The arrangement for forming the object image in an early stage within the optical element 1 allows suppressing expansion of the light-passing effective aperture on the surfaces disposed nearer to the image side than the optical diaphragm 32. The object light which has been imaged as a primary image on the intermediary image plane N1 is repeatedly reflected by the convex mirror S4, the concave mirror S5, the convex mirror S6 and the concave mirror S7 and is then refracted by the concave refractive surface S8 while undergoing the effects of powers of each of the reflective mirrors and the refractive surface, so as to form an image of the object on the plane of the image pickup element. Thus, the optical element 1 achieves the desired optical performance and functions, as a whole, as a lens unit of positive power by repeating refractions at the entrance and exit points and reflections at a plurality of reflective mirrors with curvatures.

Figure 3A:
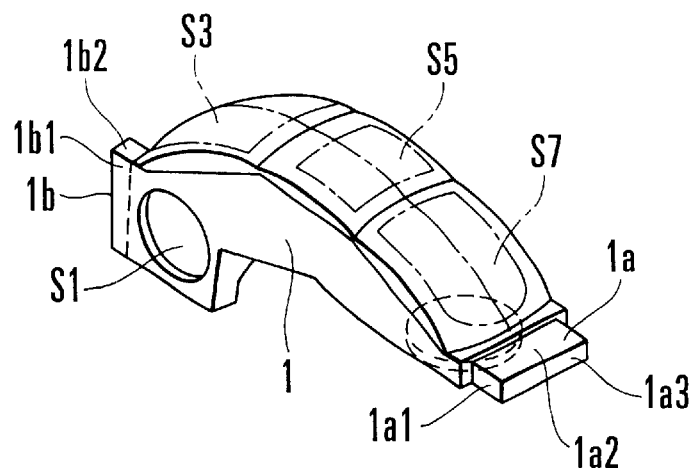
FIGS. 3A, 3B and 3C are perspective views illustrating the optical element according to the embodiment of the invention.
Figure 3B:
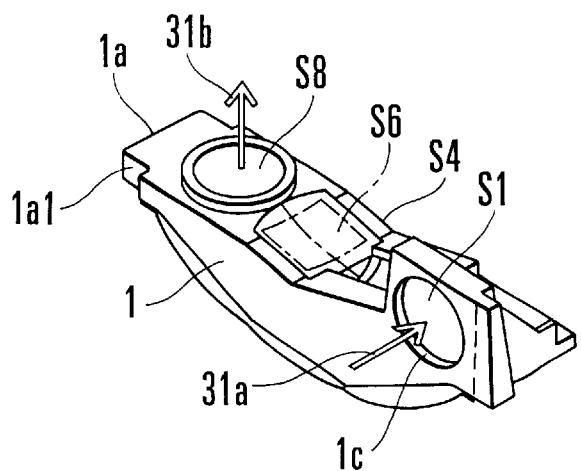
Figure 3C:
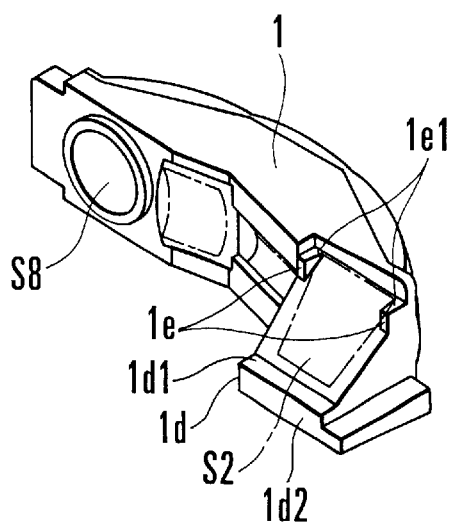

Next, FIGS. 3A, 3B and 3C show perspective views of the optical element 1 in the embodiment. The single-dotted chain line in FIGS. 3A, 3B and 3C indicates the light-passing effective area on each of the reflective surfaces. As described above, the optical element 1 has the reflective surface S2 with a 45° inclination for forming a right angle between the light-entering direction at the convex refractive surface S1 and the light-exiting direction at the concave refractive surface S8. The optical element 1 is fabricated by molding, and the inside of the optical element is filled with plastic or glass, forming an optical path. The optical element 1 is provided with the brim portion 1a, as described above. The brim portion 1a has plane parts 1a1 and 1a3 parallel to the plane containing the reference axis 31b, and a plane part 1a2 perpendicular to the plane containing the reference axis 31b. The plane parts 1a1, 1a2 and 1a3 serve as reference surfaces in fastening to a holding jig for measuring the surface shape of the optical element 1 (not described). The measurement of surface shape is conducted, for example, during mass production in order to inspect the precision of work of the surface shape. Also, the optical element 1 is provided with a brim portion 1b adjacent to the convex refractive surface S1. The brim portion 1b has a plane part 1b1 parallel to the plane containing the reference axis 31b and a plane part 1b2 perpendicular to the plane containing the reference axis 31b. The plane parts 1b1 and 1b2 are used as reference surfaces in fastening to a holding jig for the measurement of surface shape (not described).

The convex refractive surface S1 of the optical element 1 is disposed in a position one-step-recessed from an outer surface of the optical element 1, with the periphery of the surface S1 forming a cylindrical wall 1c parallel to the reference axis 31a and providing a protruded or recessed structure. Furthermore, the optical element 1 is provided with a brim portion 1d used for holding. The brim portion 1d has a plane part 1d1 parallel to the plane containing the reference axis 31b and a plane part 1d2 perpendicular to the plane containing the reference axis 31b.

The surfaces of the convex refractive surface S1 and the concave refractive surface S8 are treated to apply high transmittance film for increasing light transmittance, or antireflective coating to prevent reflection on the surface. Also, the surfaces S2 to S7 are treated by evaporation process to form thin films of Al (aluminum) or Ag (silver) to obtain high reflectivity. Ag has higher reflectivity than Al, but Ag also is more expensive than Al, requiring selection corresponding to need of each case. For example, the selection of film may be made by determining reflectivity required in each of the reflective surfaces from the sensitivity of the CCD used, the number of reflective surfaces forming an optical element and the transmittance of the material of the optical element and by taking costs into account.

Each reflective surface forming the optical element 1 is treated with reflective film coating, but it is essential to limit the area of the reflective film to a slightly wider area than the effective ray area of each surface (for example, in the embodiment, it is set as 0.5 mm empirically), because, in some cases, minute diffused light generated by reflection within the effective area enters again the effective area, causing flare in an image as a result. To minimize this effect, it is important to suppress reflection outside of the effective area.

Next is described how to hold such an optical element.

Figure 4A:
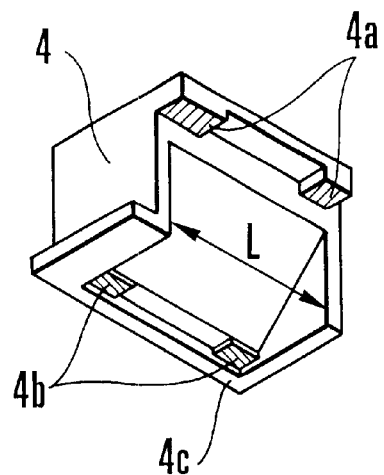
FIGS. 4A and 4B are perspective views illustrating an optical-element holding portion and a spacer in the embodiment of the invention.
Figure 4B:
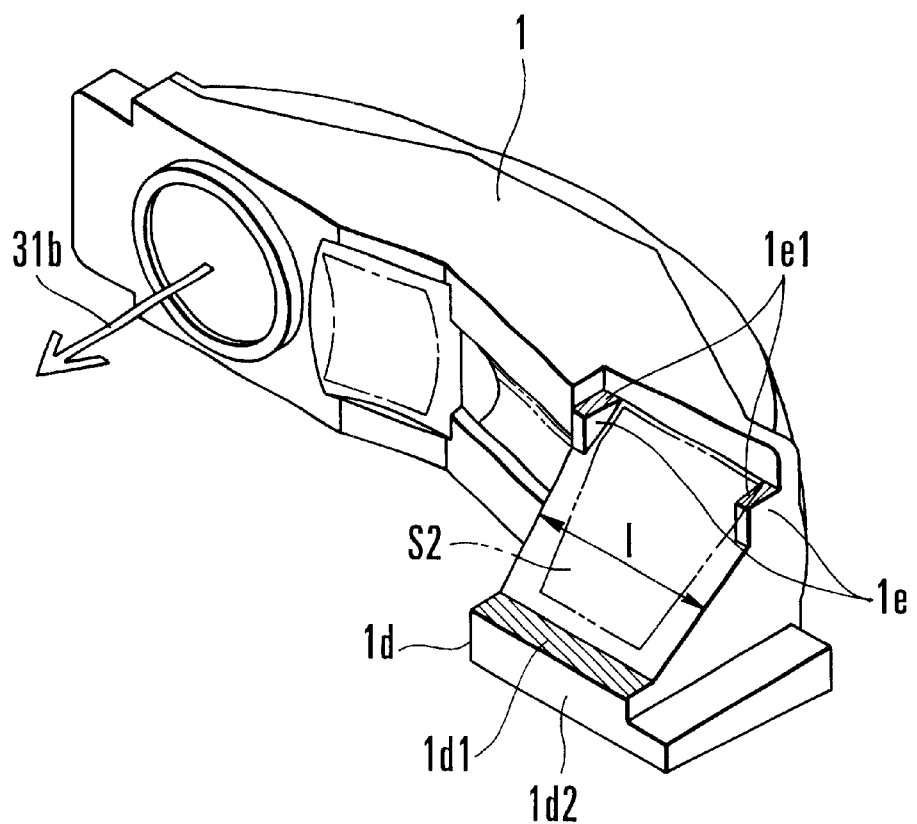

First, FIG. 4A shows a perspective view of the spacer 4 for holding the optical element 1 under pressure, and FIG. 4B shows a perspective view of the optical element 1 to be held under pressure by the spacer 4.

As shown in FIG. 4B, the plane part 1d1 described above and two triangular ribs 1e are provided around the reflective surface S2 of the optical element 1. Plane parts 1e1 of the triangular ribs 1e and the plane part 1d1 are parallel to the plane containing the reference axis 31b. The plane part 1d1 and the triangular ribs 1e are disposed as far away as possible from the effective ray area (shown by two-dotted chain line) of the reflective surface S2. This arrangement is adopted to avoid deformation of the reflective surface S2 that may be caused by a force applied to the plane part 1d1 and the triangular ribs 1e while the optical element 1 is held under pressure by the spacer 4.

FIG. 4A shows the shape of the spacer 4 that comes into contact with the optical element 1. FIG. 4A is a view of the spacer 4 looked from the side of the optical element 1. Reference numeral 4a denotes plane parts that come into contact with the plane parts 1e1 of the ribs 1e of the optical element 1, reference numeral 4b denotes plane parts that come into contact with the plane part 1d1 of the brim portion 1d of the optical element 1, and reference numeral 4c denotes a rib perpendicular to the plane parts 4a and 4b. The spacer 4 presses the optical element 1 to bring the optical element 1 into contact with the upper case 2 by a repulsive force of the spring 6 through the above four plane parts 4a and 4b.

Next is described how to hold the optical element 1 using the spacer 4 described above.

Figure 5:
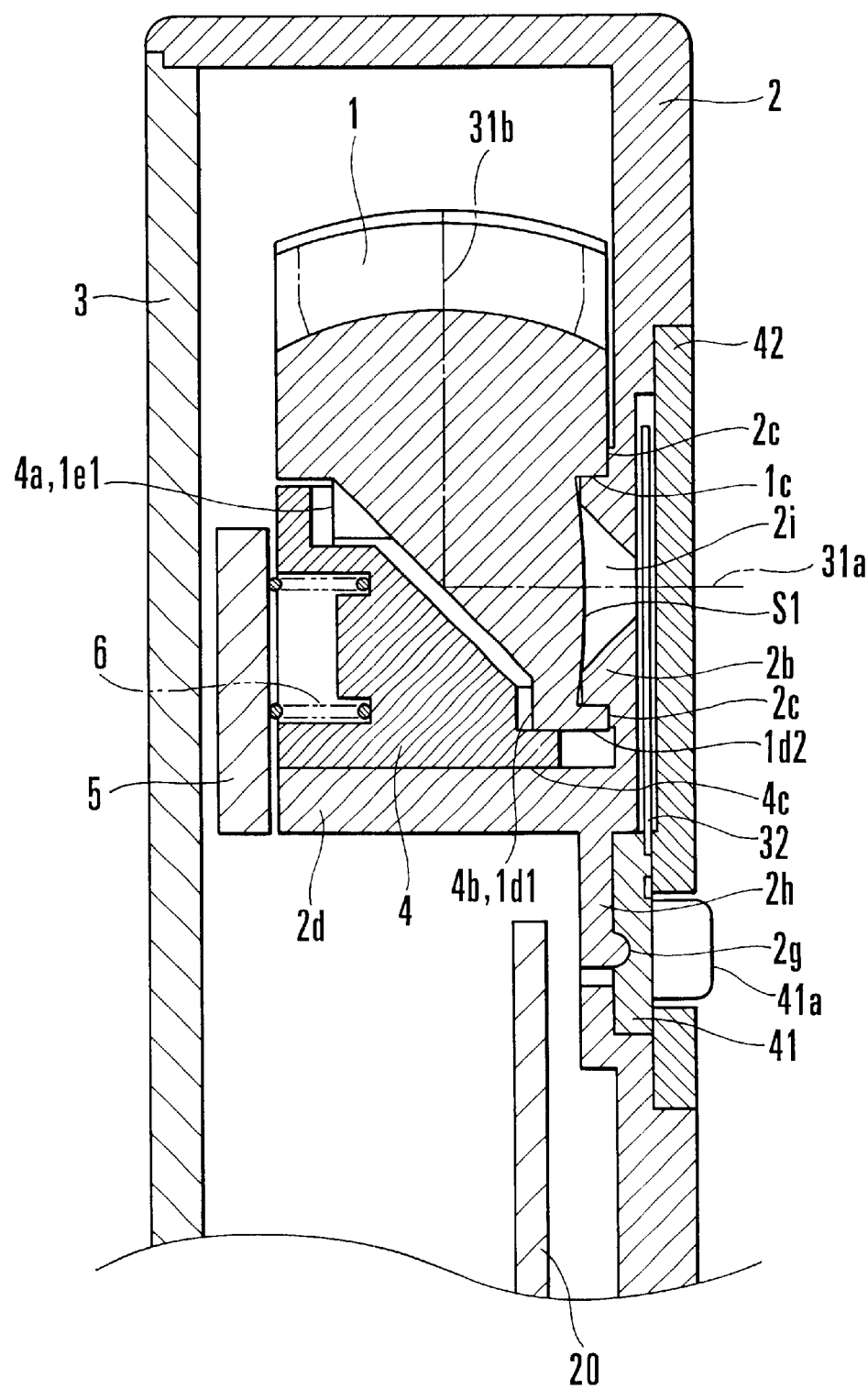
FIG. 5 is a sectional view illustrating parts, adjacent to the optical-element holding portion, of the image pickup apparatus in the embodiment of the invention.

FIG. 5 shows a sectional view showing portions adjacent to the optical-element holding portion 30 of the camera in the embodiment. FIG. 5 is a cross-sectional view along the two-dotted chain line shown in FIG. 1 as viewed from the right hand side of FIG. 1.

The upper case 2 is provided with an opening 2i for introducing light from the object. Also, the upper case 2 has a cylindrical rib 2b serving as a recessed or protruded structure. The cylindrical form of the rib 2b is concentric with the reference axis 31a. The wall 1c of the optical element 1 slidably engages with the outer periphery of the rib 2b of the upper case 2 for regulating the position of the optical element 1 with respect to the upper case 2. Also, a plane part 2c of a minimal width (specifically, about 0.7 mm in the embodiment) is disposed around the rib 2b concentrically with the rib 2b, and the optical element 1 is pressed into contact with the upper case 2 on the plane part 2c, in a manner to be described later. The reason why the contact surface is made as a plane part of a minimal width is that it is intended to make it ease to obtain flatness of the plane part in order to achieve smooth rotation of the optical element 1 as the optical element 1 is turned by a minute angle on the contact surface in the back-focus adjustment as described later.

The optical element 1 which has been fitted on the upper case 2 is held by being pressed to the upper case 2 by the holding spring 6 via the spacer 4 from the left-hand side of FIG. 5. The holding spring 6 exerts a specified pressing force by being compressed by the holder 5 screwed to the upper case 2.

Since the spacer 4 is pressed against the optical element 1 only by the holding spring 6 as shown, the regulation of position of the spacer 4 is required in the directions parallel to the plane containing the reference axis 31b. Thus, the U-shaped optical-element holding wall 2d perpendicular to the paper surface of FIG. 1 is disposed on the upper case 2 for regulating the movement of the spacer 4 in three directions by the ribs 2e with semicircular cross-section and disposed in three points on the inside of the wall 2d (see FIG. 1). On the other hand, the movement of a rib 4c of the spacer 4 in the vertical direction in FIG. 5 is restricted by the plane part 1d2 of the optical element 1. Thus, the movement of the spacer 4 is regulated in four directions in all.

In the back-focus adjustment to be described later, the optical element 1 is turned by a minute angle around the reference axis 31a, but the plane part of the optical element 1 and the plane part of the spacer 4 must always be kept in secure contact with each other. This arrangement is achieved by providing a minute space (specifically, about 0.2 mm in total in the embodiment) between the three semicircular ribs 2e and the spacer 4 so as to allow the spacer 4 to turn by a minute angle along with the optical element 1. This enables the spacer 4 to always maintain the secure contact with the optical element 1.

With the optical element 1 held under pressure as described above, it is possible to securely hold the optical element 1 in the direction of the reference axis 31a, while the optical element 1 can smoothly turn around the reference axis 31a for allowing the back-focus adjustment.

Now, here is described the positional accuracy required in mounting the optical element 1 and the CCD 7 on the camera.

The CCD 7 in the embodiment is generally used currently in the electronic camera, etc., with 410,000 pixels in ¼ inches, but the following description is not limited only to this example.

The depth of focus of an optical system is generally expressed by $F\delta$, where F is an F-number representing the brightness of a lens with a diaphragm fully opened, and $\delta$ is the diameter of an allowable circle of confusion.

Since in the embodiment, F=2.0 and, empirically, $\delta$=about 0.010 mm, the depth of focus is obtained as follows:

$F\delta$=0.020 mm.

As described above, in the image pickup apparatus according to the embodiment, both of the optical element 1 and the CCD 7 are disposed on the upper case 2. Accordingly, if the holding portion of the optical element 1 on the upper case 2 is set as a reference, there is a likelihood that the following errors take place against the designed value in positional relationship between the optical element 1 and the image pickup plane of the CCD 7 in the direction of the reference axis 31b.

(1) An error of the position of the focal plane of the optical element 1 against the reference for holding the optical element 1 (the reference axis 31a). This error is caused by the accuracy of parts fabrication of the optical element 1 and is about ±0.005 mm.

(2) An error of the position of the CCD-fixing reference plane (the plane 2m) of the upper case 2 against the reference for holding the optical element 1 disposed on the upper case 2 (the center of the opening 2i).

This error is caused by the accuracy of parts fabrication of the upper case 2 and is about ±0.030 mm.

(3) An error of the bonding position of the CCD against the base plate 9.

This error is caused by the accuracy of assembly in bonding the CCD to the base plate 9 and is about ±0.005 mm.

(4) An error of the position of the image pickup plane of the CCD against the reference plane of fixing of the CCD package (the rear side of the CCD in the embodiment).

This error is caused by the accuracy of parts fabrication of the CCD and is about ±0.020 mm.

An overall error obtained by calculating a root-sum-square value of the errors (1) to (4) is about ±0.037 mm. Since the depth of focus of the optical element 1 in the embodiment is about ±0.020 mm, as described above, probability of failing to obtain correct focusing in an assemblage without any back-focus adjustment is thought to be very large. To reduce the above-mentioned overall error, each of the errors (1) to (4) must be reduced and it is necessary to enhance the accuracy of fabrication of the upper case 2 and/or the optical element 1 or to improve the precision of parts of the CCD. However, this is undesirable because a large increase is expected in parts price. Also, in many cases, a demand for higher precision in parts tends to lower a yield rate, increasing failed products. This is undesirable in view of conservation of resources and environmental protection. Thus, it is effective to conduct the back-focus adjustment during camera assembly steps for improving costs and protecting environment and resources. Of course, the above description is not limited only to the optical element with specific parameters mentioned in the embodiment.

Figure 6:
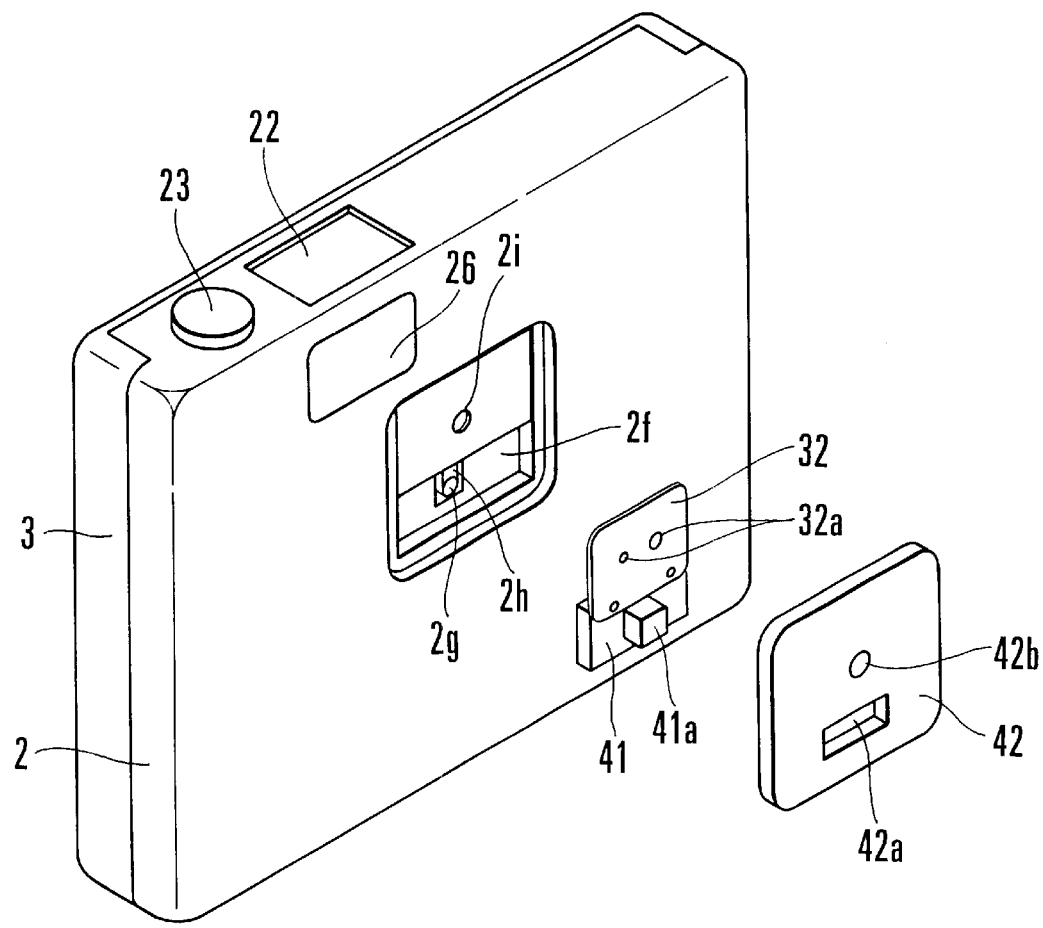
FIG. 6 is a perspective view illustrating the image pickup apparatus in the embodiment of the invention in a state where an optical diaphragm portion thereof is exploded.

Next, referring to FIGS. 5 and 6 is described the optical diaphragm. Reference numeral 32 denotes a diaphragm blade made of a film about 0.1 or 0.2 mm thick having light-blocking property. As shown in FIG. 6, two, large and small, openings 32a are provided on the film surface of the diaphragm blade 32. Reference numeral 41 is a lever for manually switching the diaphragm blade 32, which is fixed to the lever 41 by welding or the like. The lever 41, which is disposed slidably along a groove 2f of the upper case 2, is sandwiched between the groove 2f and a decorative plate 42. The decorative plate 42 is made of acrylic material, etc., and is fastened to the upper case 2 by double-coated adhesive tape or adhesives. The decorative plate 42 has a groove 42a for allowing a knob 41a of the lever 41 to pass therethrough, so that the user can operate the lever 41 from outside of the decorative plate 42.

A pressing piece 2h having a protrusion 2g is disposed in the groove 2f for pressing the lever 41 against the decorative plate 42 to eliminate play between them, as well as for generating the clicking touch when the protrusion 2g snaps into one of two depressions on the back of the lever 41 (not shown). Those two depressions are positioned so as to generate the clicking touch when one of two openings 32a of the diaphragm blade 32 coincides with the light-introducing opening 2i on the upper case 2. The decorative plate 42 is a transparent member made of acrylic resin, etc., for providing protection of the optical element 1 or making the image pickup apparatus dust-proof.

Furthermore, a part 42b of the decorative plate 42 is transparent so that the light from the object passes through the part 42b, while the other part of the decorative plate 42 around the part 42b is painted, for example, to hide the diaphragm mechanism from outside.

Incidentally, the decorative plate 42 may be made of an opaque member with a transparent inlay only in the part 42b for introducing light from the object, or the decorative plate 42 may be made by two-color molding.

The methods of pressing a lever or generating the clicking touch are not limited to those used in the embodiment. Moreover, the number of openings of the diaphragm is not limited to two, but may be increased, if required. Also, instead of manual multi-point switching of the diaphragm, the aperture of the diaphragm may be controlled automatically by moving the diaphragm blade using a driving power in association with a light measuring means.

Thus, the camera is made thinner as the diaphragm blade 32 is mounted within the thickness of the wall of the upper case 2.

The optical element in the embodiment is treated with reflective coating only over the effective area but not over the other area exposing the transparent material on the surface. In spite of this arrangement, under the brightness of ordinary circumstances under the room lighting, the optical element 1 has characteristics of preventing an image from being affected even if external light comes into the inside of the optical element 1 through the aforementioned transparent part.

Therefore, if light is blocked by a light-blocking rubber, etc., disposed between the optical element 1 and the optical correction plate 8 as in the embodiment, the light-blocking effect attained by the upper case 2 and the lower case 3 is sufficient for actual use. This arrangement eliminates a lens barrel in the conventional optical system, thereby reducing the number of parts and costs, cutting assembly cost down and realizing downsizing of an apparatus. Moreover, as an optical path of the optical element 1 passes through the inside of the optical element 1, dust-proof measures are needed only over the convex refractive surface S1 and the concave refractive surface S8. Such a function is performed in the embodiment by the light-blocking rubber 12 and the decorative plate 42. This arrangement eliminates strict dust-prevention measures required in the conventional lens barrel, thereby achieving reduction of parts costs and assembly cost. Furthermore, there is no need to darken a working place or to assemble the lower case 3 in the adjustment step after the assembly, thereby making adjustment simple.

Also, the arrangement for forming integrally the optical-element holding structure, such as the optical-element holding wall 2a and the ribs 2b, the CCD-holding wall 2d, etc., on the upper case 2 by using a mold of plastic molding provides advantages of reducing the number of parts and enhancing the positioning accuracy of the optical element 1 and the CCD 7.

Also, another advantage lies in an easy assembly from one direction owing to the construction of holding the optical element 1 and the CCD 7 on the same surface of the upper case 2.

Figure 7:
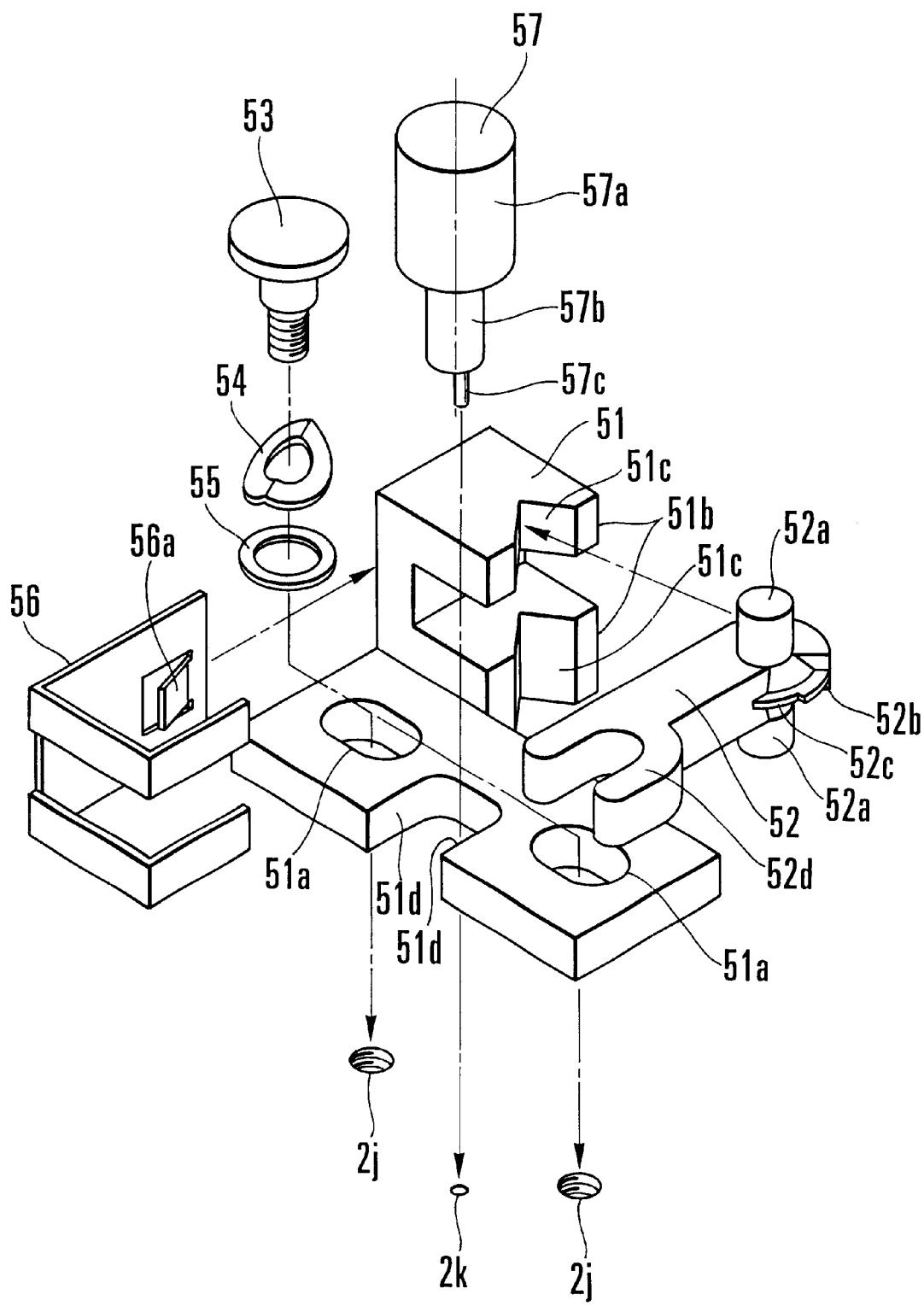
FIG. 7 is an exploded perspective view illustrating a back-focus adjusting portion of the image pickup apparatus in the embodiment of the invention.

Next, the back-focus adjusting portion 15 will be described referring to the exploded perspective view of the back-focus adjusting portion 15 shown in FIG. 7.

The back-focus adjusting portion 15 is constructed by movably disposing on the upper case 2 a cam base 51 which holds an adjusting cam 52.

On the cam base 51, two elongated round holes 51a are provided so as to position the major axes of the elongated round holes 51a in parallel. Stepped screws 53 for fixing the cam base 51 have steps with a slightly smaller diameter than the width of the above elongated round holes 51a so as to allow almost no play between the stepped screws 53 and the elongated round holes 51a. By fastening the stepped screws 53 to tapped holes 2j provided in the upper case 2 through bent washers 54, washers 55 and the cam base 51, a repulsive force of the bent washers 54 is generated to press the cam base 51 against the upper case 2. At this time, the length of the step of each stepped screw 53 is set so as to warp the bent washer 54 but not flatten the bent washer 54 completely when the stepped screw 53 is fully screwed. This arrangement prevents the cam base 51 from being completely fixed to the upper case 2, thereby allowing the cam base 51 to move in the lengthwise direction of the elongated round holes 51a.

The adjusting cam 52 is composed of a shaft 52a serving as the center of rotation of the adjusting cam 52, two cam surfaces 52b and 52c concentric with the shaft 52a and having respective different radii, and a U-shaped arm 52d. On the other hand, the cam base 51 has two-pronged arms 51b for pivotally supporting the adjusting cam 52. Each of the arms 51b has a cut-off part 51c with which the shaft 52a of the adjusting cam 52 comes into contact. After bringing the shaft 52a of the adjusting cam 52 into contact with the cut-off parts 51c, the shaft 52a is pressed by a leaf spring 56 so as to bring the shaft 52a into tight contact with the plane surfaces of the cut-off parts 51c, thereby heightening the positional accuracy of the adjusting cam 52. The leaf spring 56 works to integrate the adjusting cam 52 with the cam base 51, thereby facilitating handling during assembly. The leaf spring 56 has a raised tab 56a, which engages with the cam base 51 to prevent the leaf spring 56 from coming off the cam base 51.

Figure 8A:
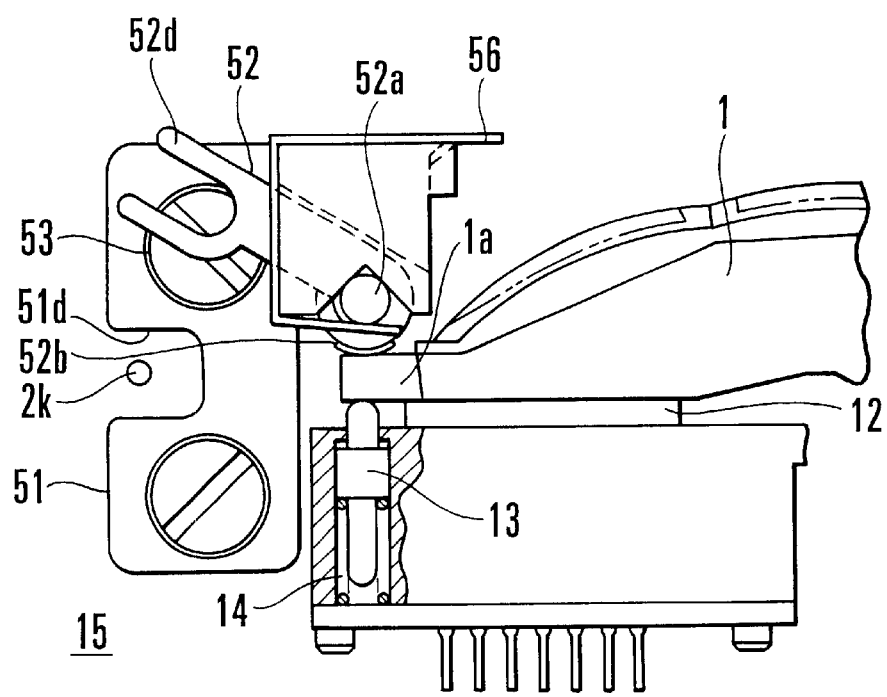
FIGS. 8A and 8B are plan views illustrating the back-focus adjusting portion of the image pickup apparatus in the embodiment of the invention.
Figure 8B:
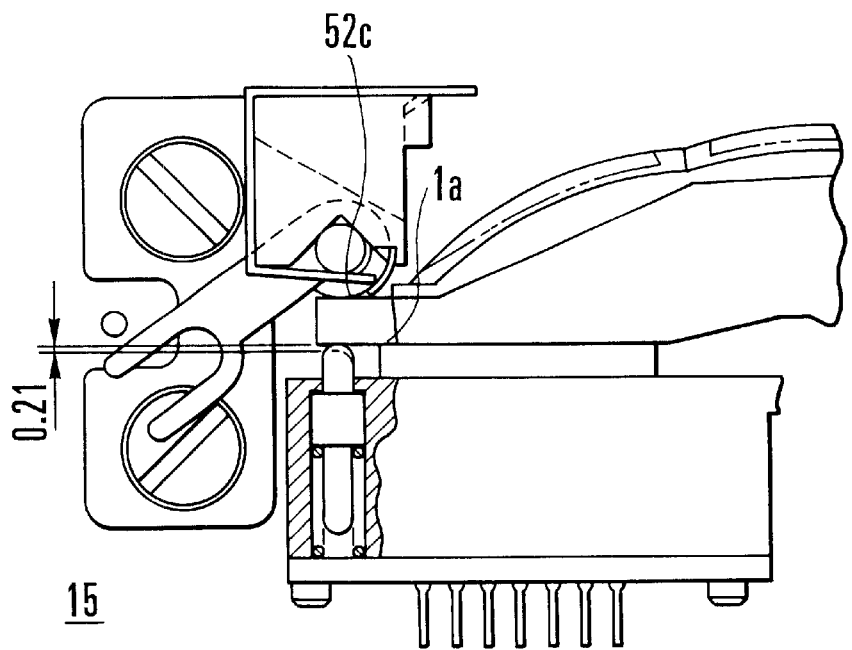
Figure 9A:
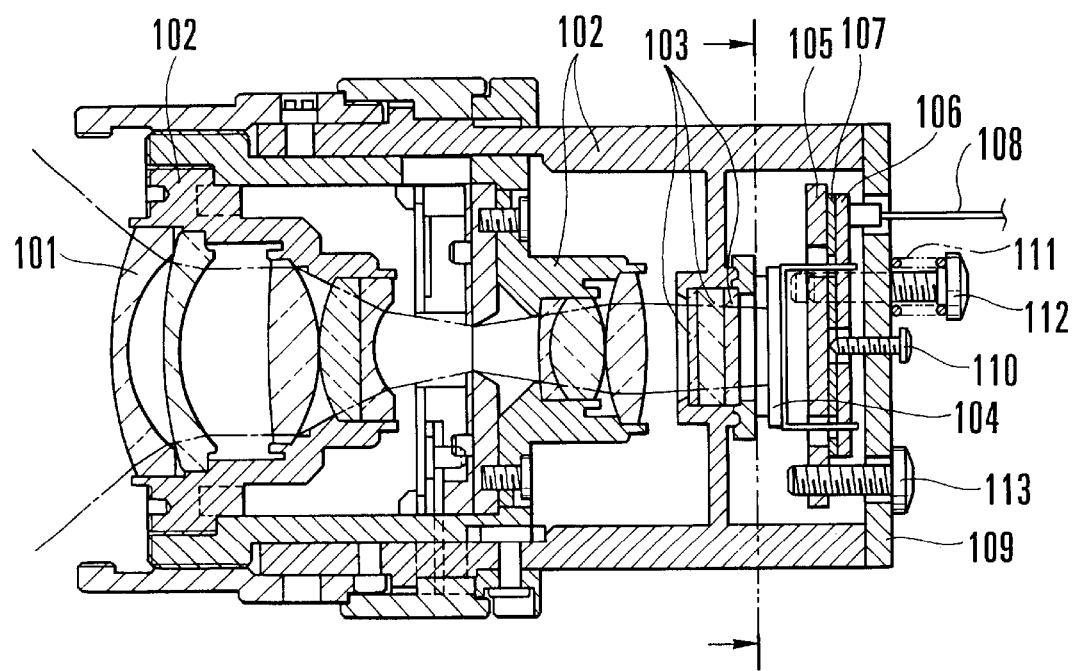
FIGS. 9A and 9B are sectional views illustrating an optical system in a conventional image pickup apparatus.
Figure 9B:
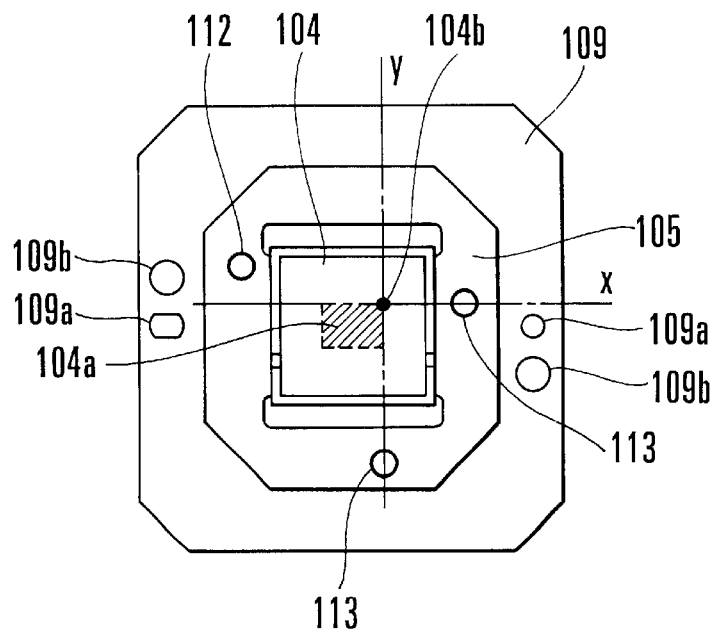

Next, referring to FIGS. 8A and 8B is described how to conduct the back-focus adjustment of the optical element 1 by using the back-focus adjusting portion 15.

First, referring to FIG. 8A is described how to conduct the back-focus adjustment in photo-taking in a normal distance.

The adjusting cam 52 is rotated clockwise to bring the adjusting cam 52 in a position shown in FIG. 8A. At this time, the brim portion 1a of the optical element 1 is pushed by the press-for-adjustment piece 13 from the bottom of FIG. 8A to come into pressed contact with the cam surface 52b of the adjusting cam 52. The cam base 51 has a U-shaped cutout 51d, while a circular recess 2k is disposed in a position of the upper case 2 corresponding to the cutout 51d. Here, adjustment is conducted using an adjustment tool 57 shown in FIG. 7, which is composed of three parts, i.e., a handle 57a, an operation shaft 57b and a pivot shaft 57c. The handle 57a is concentric with the operation shaft 57b, while the operation shaft 57b and the pivot shaft 57c are slightly eccentric each other. After the pivot shaft 57c is inserted into the recess 2k of the upper case 2, the adjustment tool 57 is turned to bring the operation shaft 57b into contact with an edge of the cut-out 51d, so that the cam base 51 is moved toward the top or bottom in FIG. 8A.

At this time, the optical element 1 is held with the brim portion 1a being pinched between the semicircular cam surfaces 52b of the adjusting cam 52 and the spherical surface of the tip of the press-for-adjustment piece 13, so that even if the optical element 1 is turned and the brim portion 1a is tilted at a minute angle, the contact point is changed so as to securely hold the optical element 1. Also, the arrangement for holding the optical element 1 by pinching the brim portion 1a is effective to suppress deformation, etc., of the shape of reflective surfaces or refractive surfaces at a minimum. Furthermore, as the optical element 1 is held turnably and the brim portion 1a is pinched only by pressure of the spring in the back-focus adjusting portion 15 without locking the tilt of the brim portion 1a, the optical element 1 will not receive any moment that will work to bend the optical element 1 due to a holding force exerted on the optical element 1 in the optical-element holding portion 30 and a pinching force in the back-focus adjusting portion 15, irrespective of the posture of the optical element 1. This arrangement does not exert any negative effect on the optical performance of the optical element 1.

The above adjustment work is conducted while monitoring output signals from the CCD 7, so that the back-focus adjustment can be performed by finding the point where the sharpest focus is obtained. Here, since the force for pressing the cam base 51 to the upper case 2 is made sufficiently large, the cam base 51 does not move from the adjusted position due to transportation or vibration of the apparatus. Needless to say, finer minute adjustment can be possible by making the eccentricity smaller between the operation shaft 57b and the pivot shaft 57c of the adjustment tool 57.

The optical element in the embodiment of the invention generally tends to have a shape elongated lengthwise as it has a series of successive reflective surfaces with a light-entering surface at one end for repeating reflections many times. As the optical element has such a shape, the center of turning of the optical element is disposed at a position as far away from the light-exiting surface as possible, i.e., at a position adjacent to the light-entering surface, so that the turning angle of the optical element in the back-focus adjustment is minimized and the amount of tilt of the image plane with respect to the image pickup plane of the image pickup element is suppressed at a minimum. Moreover, the brim portion 1a is disposed adjacent to the concave refractive surface S8 and is pinched with the back-focus adjusting portion 15, so that the optical element 1 can be securely held at its both ends as well as being held by the optical-element holding portion 30.

Furthermore, the reference axis 31a of the convex refractive surface S1 is selected as the center of turning of the optical element 1, so that the position of the convex refractive surface S1 does not change even if the optical element 1 is turned. This arrangement prevents vignetting from occurring due to positional deviation between the convex refractive surface S1 and the diaphragm 32 or the opening 2i, thereby eliminating need to alter the position of aperture of the optical diaphragm or the position of the opening 2i. Moreover, the circular wall 1c concentric with the reference axis 31a is formed around the convex refractive surface S1 of the optical element 1 by utilizing molding, and the rib 2b of the upper case 2 is made to fit into the circular wall 1a, so that a holding mechanism with simple configuration and accurate rotational characteristics can be attained.

Next, referring to FIG. 8B is described how to conduct the back-focus adjustment in close-up photo-taking (macro-photo-taking).

The optical element 1 in the embodiment has an optical characteristic in which the position of focus moves further away (defocus) from the optical element 1 in the case of close-up photo-taking with the object several tens of centimeters away (hereinafter referred to as macro-photo-taking), as compared to the normal photo-taking. The amount of such defocusing in the optical element 1 in the embodiment is about 0.16 mm. Accordingly, in order to place the CCD 7 always within the depth of focus, the distance between the optical element 1 and the CCD 7 is switched between the normal photo-taking and the macro-photo-taking. According to the embodiment, in the case of the macro-photo-taking, the optical element 1 is moved by operating a switching lever (not shown) provided on the lower case 3. The switching lever is engaged with the U-shaped arm 52d of the adjusting cam 52. When the switching lever is operated, the adjusting cam 52 is made to turn around the rotation shaft 52a.

As described above, the adjusting cam 52 is divided into two areas, i.e., the cam surface 52b and the cam surface 52c. Where radii of the cam surface 52b and the cam surface 52c are represented by R(b) and R(c), respectively, the difference Δr between the radii R(b) and R(c) in the embodiment is set as follows:

$$\Delta r = R(b) - R(c)$$
$$\approx 0.21 \text{ mm.}$$

This setting is due to the fact that the amount of defocusing of about 0.16 mm stated above is a value on the reference axis 31b, so that the amount of adjustment at the contact point between the cam surface 52b or the cam surface 52c and the brim portion 1a of the optical element 1 is required to be increased in proportion to the distance from the center of turning of the optical element 1.

As described above, the position of the optical element 1 is regulated by the cam surface 52b in the case of the normal photo-taking, as shown in FIG. 8A, and by the cam surface 52c in the case of the macro-photo-taking, as shown in FIG. 8B, thereby allowing good photo-taking without defocusing with respect to the object in a wide range of distances from the near distance to the far distance.

In the embodiment, the cam is provided with two diameters, but more than two diameters may be provided for the cam to allow multi-step adjustment. In addition, if the cam surface is formed with continual curving, it is possible to realize a manual-focusing that allows performing optimum focusing to an object in any given distance.

Furthermore, in the embodiment, focus adjustment is conducted using a plurality of cams corresponding to the distances to the object, but this arrangement may be used for other purposes, for example, for the focus adjustment of a focal plane due to temperature variations.

Moreover, if the pressing member is moved by a driving source in association with an existing focusing algorithm, autofocusing can be attained.

As described above, the arrangement for holding the optical element 1 turnably to conduct the back-focus adjustment makes it possible to adjust only the back-focus, so that the conventional complex adjustment mechanism becomes unnecessary, thereby bringing such advantages as downsizing of the apparatus, simplifying production procedures in large measure and reducing parts costs.

As described above, according to the embodiment, the optical element 1 is provided with the wall 1c which is formed in a circular shape with the reference axis 31a of the entrance refractive surface (the convex refractive surface S1) as its center and which is a protruded or recessed structure having a plane part perpendicular to the reference axis 31a. This arrangement makes it possible to accurately determine the position of the reference axis 31a of the light-entering surface with respect to the image pickup apparatus by forming the position of the protruded or recessed structure and the reference axis 31a with high precision and using the protruded or recessed structure to determine the position.

Also, since a protrusion (the brim portion 1a) is provided adjacent to the exit refractive surface (the concave refractive surface S8) of the optical element 1, it is possible to determine the position of the optical element 1 in a longer span to enhance the accuracy of its posture by fastening the optical element 1 using a fitting-in portion (the wall 1c) and the protrusion (the brim portion 1a).

Furthermore, in the image pickup apparatus having the optical element 1 and the base for fastening the optical element 1, the base has a recessed or protruded structure (the rib 2b) for engaging with the protruded or recessed structure (the wall 1c) of the optical element 1, as well as the arresting means (the pressing piece 13 and the adjusting cam 52) for arresting the protrusion (the brim portion 1a) of the optical element 1 to fasten the optical element 1 on the base at the recessed or protruded structure and the protrusion, so that the position of the optical element 1 is highly accurately determined with respect to the base, as the optical element 1 is directly disposed on the base without any intermediary parts.

Moreover, the arrangement for holding the optical element 1 turnably with respect to the base to enable the image plane of the optical element 1 to approach or move away from the image pickup plane of the image pickup element (the CCD 7) eliminates any complex adjustment mechanism for the back-focus adjustment, thereby realizing a back-focus adjustment method for achieving down-sizing of the apparatus and cost reduction of parts and process.

Furthermore, as the center of tuning of the optical element 1 is aligned with the reference axis 31a of the entrance refractive surface, occurrence of tilt of the optical element 1 when the optical element 1 is turned is minimized, and no alteration of positions of the optical diaphragm or the opening of the base is necessary, because the reference axis 31a stays in a position.

Moreover, as the optical element 1 is held under pressure in the direction of the turning axis approximately at the center of turning of the optical element 1, the optical element 1 can be held turnably in the secure and stable state.

Furthermore, since the tongue-like protrusion (the brim portion 1*a*) of the optical element 1 is pinched between a pair of circular or spherical pressing members (the pressing piece 13 and the adjusting cam 52) opposing each other and urged in the mutually approaching direction, even if the optical element 1 is turned and the protrusion is tilted by a minute angle, the optical element 1 is always securely held owing to the shift of the contact point between the pressing members and the protrusion. Also, the arrangement for holding the protrusion by pinching, without directly pinching the optical element 1, serves to suppress effects, such as deformation, exerted by the pinching force to reflective surfaces or refractive surfaces at a minimum.

Moreover, as the pressing members (the pressing piece 13 and the adjusting cam 52) pinch the protrusion (the brim portion 1*a*) approximately only on one point, no moment to bend the optical element 1 takes place by the pressing force at the approximate turning center and the pinching force on the protrusion, thereby producing no effect on the optical performance of the optical element 1.

Furthermore, as the cam base 51 is made movable in the pressing direction but also, to be stopped and fixed at any given point, the back-focus adjustment can be performed with ease.

Furthermore, one of the pressing members is a cam member (the adjusting cam 52) having a plurality of cam surfaces 52*b* and 52*c*, so that it is always possible to take in-focus pictures by changing the focal length in accordance with a change of shooting conditions such as the distance to the object, etc.

Moreover, as the outer covering member (the upper case 2) is made to directly hold the optical element 1 and the image pickup element (the CCD 7), a conventional lens barrel with a complex construction is not necessary, making down-sizing, reducing thickness and cutting cost of the apparatus possible, to realize an image pickup apparatus utilizing advantages of the optical element in the embodiment.

Also, as the base for holding the optical element 1 is constructed with the outer covering member 2, it is possible to reduce the thickness of the image pickup apparatus.

Also, as the holding structures for the optical element 1 and the image pickup element 7 are provided on the same outer covering member 2, it is possible to enhance the accuracy in position between them.

Also, as the optical element 1 and the image pickup element 7 are on the same surface of the outer covering member 2, it is possible to perform assembly from one direction in the assembly step, thereby facilitating the assembly step.

Also, the light-blocking measures are required only on minimum necessary parts, so that there is no need to take trouble of darkening a workplace or temporarily assembling the outer cases for tentative assemblage, thereby making the adjustment step easy.

Moreover, the image pickup apparatus can be made thinner as the optical diaphragm blade 32 for regulating the amount of light entering the optical element 1 is provided and the holding mechanism for holding the optical diaphragm blade 32 is constructed integrally with the outer covering member 2.

According to the above-described embodiment, it is possible to accurately determine the position of the reference axis of light-entering surface with respect to the image pickup apparatus by positioning using a protruded or recessed structure.

Moreover, as the optical element is held turnably to enable the image plane of the optical element to approach or move away from the image pickup plane of the image pickup element, it is possible to realize a back-focus adjustment method that can achieve down-sizing of the apparatus and cost reduction of parts and process.

Moreover, as the outer covering member is made to directly hold the optical element and the image pickup element, it is possible to realize down-sizing, reduction of thickness and cutting cost of the apparatus, thereby achieving an image pickup apparatus utilizing advantages of the optical element.

What is claimed is:

1. An optical apparatus comprising:

an optical element;

a casing accommodating said optical element;

said optical element comprising an entrance refractive surface, an exit refractive surface and a plurality of reflective surfaces provided between said entrance refractive surface and said exit refractive surface, a light flux entering an inside of said optical element at said entrance refractive surface, being reflected a plurality of times at said plurality of reflective surfaces and exiting from said exit refractive surface;

wherein a protruded structure or a recessed structure formed in a circular shape or a cylindrical shape with a center thereof set to a reference axis of the entering light flux is provided adjacent to said entrance refractive surface; and wherein said casing has an engaging portion engaging with said protruded structure or said recessed structure, said optical element being turnable about the reference relative to said casing.

2. An optical apparatus according to claim 1, wherein said protruded structure or said recessed structure has a plane portion perpendicular to said reference axis.

3. An optical apparatus according to claim 1, wherein a side portion of said protruded structure or recessed structure is formed in parallel with the reference axis.

4. An optical apparatus according to claim 1, wherein said plurality of reflective surfaces include a reflective surface arranged to bend a reference axis of said entrance refractive surface by 90°.

5. An optical apparatus according to claim 4, wherein a reference axis of said refractive surface is deflected to be perpendicular to the reference axis of said entrance refractive surface.

6. An optical apparatus according to claim 5, wherein a protruded structure of cylindrical shape with a center thereof set to a reference axis of an exiting light flux is provided adjacent to said exit refractive surface.

7. An optical apparatus according to claim 1, wherein said optical element is formed with a transparent body, and at least one surface of said plurality of reflective surfaces is a free curved surface.

8. An optical apparatus according to claim 7, wherein the light flux having entered said entrance refractive surface is imaged as a primary image within said optical element by a power of said entrance refractive surface and a power of at least one of said plurality of reflective surfaces.

9. An optical apparatus according to claim 1, wherein the light flux having entered said refractive surface is imaged as a primary image within said optical element by a power of said entrance refractive surface and a power of at least one of said plurality of reflective surfaces.

10. An optical apparatus according to claim 1, wherein protrusions used for the positioning are respectively provided adjacent to said entrance refractive surface and adjacent to said exit refractive surface.

11. An optical apparatus according to claim 1, wherein a protrusion used for positioning is provided adjacent to said entrance refractive surface.

12. A holding structure for holding an optical element having an entrance refractive surface, an exit refractive surface and a plurality of reflective surfaces provided between said entrance refractive surface and said exit refractive surface, a light flux entering an inside of said optical element at said entrance refractive surface, being reflected a plurality of times at said plurality of reflective surfaces and exiting from said exit refractive surface, said holding structure comprising:

a supporting member which supports said optical element in such a way as to make said optical element turnable for adjustment around a reference axis of an entering light flux at said entrance refractive surface; and wherein said optical element is provided, adjacent to said entrance refractive surface, with a circular or cylindrical portion with a center thereof set to a reference axis of an entering light flux, and said supporting member comes into contact with said circular or cylindrical portion to make said optical element turnable for adjustment around said reference axis.

13. A holding structure for holding an optical element having an entrance refractive surface, an exit refractive surface and a plurality of reflective surfaces provided between said entrance refractive surface and said exit refractive surface, a light flux entering an inside of said optical element at said entrance refractive surface, being reflected a plurality of times at said plurality of reflective surfaces and exiting from said exit refractive surface, said holding structure comprising:

a supporting member which supports said optical element in such a way as to make a position of said exit refractive surface movable to vary an image forming position of a light flux; and wherein said optical element is elastically pressed against said supporting member, and a position of said supporting member is changeable by an adjusting operation of an adjustment member, whereby the position of said exit refractive surface is moved to vary the image forming position of the light flux.

14. A holding structure according to claim 13, wherein a contact portion of said supporting member for coming into contact with said optical element is formed in a cam-surface shape.

15. An image pickup apparatus comprising:

an optical element having an entrance refractive surface, an exit refractive surface and a plurality of reflective surfaces provided between said entrance refractive surface and said exit refractive surface, a light flux entering an inside of said optical element at said entrance refractive surface, being reflected a plurality of times at said plurality of reflective surfaces and exiting from said exit refractive surface;

a diaphragm device provided on a light-flux entering side of said entrance refractive surface of said optical element;

an image pickup element provided on a light-flux exiting side of said exit refractive surface of said optical element; and a case which houses therein said optical element, said diaphragm device and said image pickup element, wherein an amount of aperture opening of said diaphragm device is varied by a movement of a diaphragm member.

16. An image pickup apparatus according to claim 15, wherein a reference axis of said exit refractive surface of said optical element is deflected to be perpendicular to a reference axis of said entrance refractive surface of said optical element, and said image pickup element is disposed inside said case in such a way as not to overlap with said optical element with respect to a direction of said reference axis of said entrance refractive surface.

17. An image pickup apparatus according to claim 16, further comprising:

a supporting member which supports said optical element in such a way as to make said optical element turnable for adjustment around a reference axis of an entering light flux at said entrance refractive surface.

18. An image pickup apparatus according to claim 16, further comprising:

a supporting member which supports said optical element in such a way as to make a position of said exit refractive surface movable to vary an image forming position of a light flux.

19. An image pickup apparatus according to claim 15, further comprising:

a supporting member which supports said optical element in such a way as to make said optical element turnable for adjustment around a reference axis of an entering light flux at said entrance refractive surface.

20. An image pickup apparatus according to claim 19, wherein said optical element is provided, adjacent to said entrance refractive surface, with a circular or cylindrical portion with a center thereof set to said reference axis of the entering light flux, and said supporting member comes into contact with said circular or cylindrical portion to make said optical element turnable for adjustment around said reference axis of the entering light flux.

21. An image pickup apparatus according to claim 15, further comprising:

a supporting member which supports said optical element in such a way as to make a position of said exit refractive surface movable to vary an image forming position of a light flux.

22. An image pickup apparatus according to claim 21, wherein said optical element is elastically pressed against said supporting member, and a position of said supporting member is changeable by an adjusting operation of an adjustment member, whereby the position of said exit refractive surface is moved to vary the image forming position of the light flux.

23. An image pickup apparatus according to claim 15, wherein said diaphragm member is supported by said case in such a way as to be movable.

24. An image pickup apparatus according to claim 15, wherein said optical element is supported by being pressed against respective supporting members at a position of said entrance refractive surface and a position of said exit refractive surface.

25. An image pickup apparatus comprising:

an optical element having an entrance refractive surface, an exit refractive surface and a plurality of reflective surfaces provided between said entrance refractive surface and said exit refractive surface, a light flux entering an inside of said optical element at said entrance refractive surface, being reflected a plurality of times at said plurality of reflective surfaces and exiting from said exit refractive surface;

a diaphragm device provided on a light-flux entering side of said entrance refractive surface of said optical element;

an image pickup element provided on a light-flux exiting side of said exit refractive surface of said optical element;

a case which houses therein said optical element, said diaphragm device and said image pickup element;

a supporting mechanism which supports said optical element in such a way as to make a position of said exit refractive surface movable to vary an image forming position of a light flux; and wherein said supporting mechanism includes a supporting member which supports said optical element in such a way as to make said optical element turnable for adjustment around a reference axis of an entering light flux at said entrance refractive surface.

26. An image pickup apparatus according to claim 25, wherein said supporting mechanism includes a supporting member which supports said optical element in such a way as to make a position of said exit refractive surface movable to vary an image forming position of a light flux.

27. An image pickup apparatus according to claim 26, wherein said optical element is elastically pressed against said supporting member, and a position of said supporting member is changeable by an adjusting operation of an adjustment member, whereby the position of said exit refractive surface is moved to vary the image forming position of the light flux.

28. An image pickup apparatus according to claim 25, wherein said optical element is provided, adjacent to said entrance refractive surface, with a circular or cylindrical portion with a center thereof set to a reference axis of an entering light flux, and said supporting member comes into contact with said circular or cylindrical portion to make said optical element turnable for adjustment around said reference axis of the entering light flux.

* * * * *